(12) United States Patent
Kwon et al.

(10) Patent No.: US 12,503,180 B2
(45) Date of Patent: Dec. 23, 2025

(54) MOBILE OBJECT ASSEMBLY STATION AND MOBILE OBJECT ASSEMBLY SYSTEM INCLUDING THE SAME

(71) Applicants: HYUNDAI MOTOR COMPANY, Seoul (KR); KIA CORPORATION, Seoul (KR)

(72) Inventors: Seok Ryung Kwon, Seoul (KR); Hyeon Sik Shin, Hwaseong-si (KR); Pan Keun Baek, Osan-si (KR); Jun Hwan Park, Seoul (KR); Hun Keon Ko, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 918 days.

(21) Appl. No.: 17/725,236

(22) Filed: Apr. 20, 2022

(65) Prior Publication Data
US 2023/0041721 A1    Feb. 9, 2023

(30) Foreign Application Priority Data

Aug. 4, 2021    (KR) .................. 10-2021-0102740

(51) Int. Cl.
| | |
|---|---|
| B62D 65/02 | (2006.01) |
| B62D 24/00 | (2006.01) |
| B62D 63/02 | (2006.01) |
| B62D 65/00 | (2006.01) |
| B62D 65/04 | (2006.01) |
| B66F 9/20 | (2006.01) |

(52) U.S. Cl.
CPC .......... B62D 65/026 (2013.01); B62D 24/00 (2013.01); B62D 63/025 (2013.01); B62D 65/00 (2013.01); B62D 65/024 (2013.01); B62D 65/04 (2013.01); B66F 9/20 (2013.01); *B65G 2201/0294* (2013.01)

(58) Field of Classification Search
CPC .... B62D 65/026; B62D 24/00; B62D 63/025; B62D 65/00; B62D 65/024; B62D 65/04; B66F 9/20; B65G 2201/0294
See application file for complete search history.

(56) References Cited

U.S. PATENT DOCUMENTS 5,364,469 A * 11/1994 Wakabayashi ..... B65G 49/0459
                                                                198/465.4
5,651,822 A *  7/1997 Heckmann ................ B05C 3/10
                                                                118/409
5,678,973 A    10/1997 Cox
5,972,112 A * 10/1999 Wood ........................ B05C 3/04
                                                                118/423

(Continued)

FOREIGN PATENT DOCUMENTS

| | | |
|---|---|---|
| JP | 2003335169 A | 11/2003 |
| JP | 2011235689 A | 11/2011 |
| WO | 2021008874 A1 | 1/2021 |

*Primary Examiner* — Ryan J. Walters
(74) *Attorney, Agent, or Firm* — Lempia Summerfield Katz LLC (57) ABSTRACT

A mobile object assembly system includes a mobile object assembly station. The mobile object assembly station includes a station body extending in an upward/downward direction and includes a first support that is coupled to one side surface of the station body and that presses one side surface of an upper cabin of a mobile object upwards.

9 Claims, 9 Drawing Sheets

(56) References Cited

U.S. PATENT DOCUMENTS

| | | | | |
|---|---|---|---|---|
| 7,225,914 | B2* | 6/2007 | Nakamura | B62D 65/18 |
| | | | | 198/465.4 |
| 7,789,021 | B2* | 9/2010 | Nishihara | B62D 65/18 |
| | | | | 105/154 |
| 10,308,125 | B2 | 6/2019 | Ahrens | |
| 2013/0206059 | A1* | 8/2013 | Robbin | B05C 13/02 |
| | | | | 118/423 |
| 2014/0190406 | A1* | 7/2014 | Covizzi | B65G 49/049 |
| | | | | 118/426 |
| 2015/0114736 | A1 | 4/2015 | Avganim | |
| 2016/0297623 | A1* | 10/2016 | Covizzi | B65G 49/0481 |
| 2017/0028900 | A1 | 2/2017 | Stocks et al. | |
| 2020/0369140 | A1 | 11/2020 | Mccarron et al. | |

\* cited by examiner

MOBILE OBJECT ASSEMBLY STATION AND MOBILE OBJECT ASSEMBLY SYSTEM INCLUDING THE SAME

CROSS-REFERENCE TO RELATED APPLICATION

This application claims the benefit of priority to Korean Patent Application No. 10-2021-0102740, filed in the Korean Intellectual Property Office on Aug. 4, 2021, the entire contents of which are incorporated herein by reference.

TECHNICAL FIELD

The present disclosure relates to a mobile object assembly station and a mobile object assembly system including the same.

BACKGROUND

In general, a platforming strategy of designing a mobile object platform that shares some common components is widely used in the automobile manufacturing industries to reduce component costs due to economy of scale and ease in changing designs.

In particular, an electric vehicle includes a lower vehicle body and various kinds of upper cabins are fixed to the lower vehicle body. Accordingly, a method of producing various kinds of electric vehicles according to specific purposes is possible. For example, an upper cabin manufactured according to a specific purpose (i.e., use), such as a food truck, an ambulance, an unmanned delivery vehicle, or the like is installed on a lower vehicle body, in which a driving unit is installed. Further, an existing upper cabin is replaced by an upper cabin for another purpose, so that different kinds of vehicles may be manufactured according to necessity (i.e., need). This is called a purpose built mobile object or a purpose built vehicle (PBV) and corresponds to a base of future industries suggested by several vehicle manufacturers.

However, due to the characteristics of the vehicles including complex structures and many kinds of components, it takes significant time and significant manpower to install an upper cabin on the lower vehicle body or to replace the upper cabin installed on the lower vehicle body with another kind of an upper cabin.

In particular, to replace the upper cabin, a configuration capable of raising the upper cabin seated on the lower vehicle body from the lower vehicle body is necessary.

SUMMARY

The present disclosure has been made to solve the abovementioned problems occurring in the prior art while maintaining advantages achieved by the prior art.

An aspect of the present disclosure provides a mobile object assembly station that may raise an upper cabin seated on a lower vehicle body upwards. Another aspect of the present disclosure is to provide a mobile object assembly system including the same.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a mobile object assembly station includes a station body extending in an upward/downward (i.e., a vertical) direction and includes a first support coupled to a first side surface of the station body. that the first support presses a first side surface of an upper cabin of a mobile object upwards.

In another example, when it is assumed that a direction in which the station body faces the mobile object when the mobile object proceeds toward the station body is a front side, the first support may include a first link member extending forwards and fixed to the first side surface of the station body. The first support may also include a second link member, one end of which is connected to a front distal end of the first link member to be rotatable and a third link member, one end of which is coupled to the first side surface of the station body to be rotatable. The first support may further include a connection member connecting the second link member and the third link member, coupled to one point of the third link member to be rotatable, and through which the second link member passes.

In another example, the first support further may include a fourth link member extending forwards, one end of which is fixed to one side surface of the station body, fixed to an upper side of one end of the first link member, and an opposite end of which is connected to a front distal end of the first link member.

In another example, a plurality of holes arranged in an upward/downward (i.e., vertical) direction may be famed on the one side surface of the station body. One end of the first link member may be fixed to any one of the plurality of holes and one end of the fourth link member may be fixed to another one of the plurality of holes.

In another example, the first support further may include an elastic member, one end of which is fixedly coupled to one point of the second link member, and an opposite end of which elastically supports the connection member.

In another example, the connection member may be disposed on an upper side of the first link member.

In another example, the first support may further include a boss member protruding from a front distal end of the third link member inwards in a leftward/rightward (i.e., horizontal) direction and inserted into a guide groove formed in the upper cabin.

In another example, the mobile object assembly station may further include a second support coupled to a second side surface of the station body. that the second support may press a second side surface of the upper cabin upwards and the first support and the second support may have corresponding shapes.

According to an aspect of the present disclosure, a mobile object assembly system may include a mobile object including an upper cabin and a lower platform configured such that the upper cabin is seated on an upper side thereof and coupled to the upper cabin to be separable The mobile object assembly station may also include a station body extending in an upward/downward (i.e., vertical) direction and a first support coupled to one side surface of the station body. that the first support may press one side surface of the upper cabin separated from the lower platform upwards.

In another example, the lower platform may include: a body member configured such that the upper cabin is seated thereon; a coupling member coupled to the body member, configured to protrude in a specific direction, and that couples the upper cabin and the lower platform while protruding; and a sensor member coupled to a distal end of the coupling member in the specific direction. that the sensor member may acquire information on a distance between the distal end of the coupling member in the specific direction and the upper cabin.

In another example, a pair of coupling members and a pair of sensor members may be provided on left and right sides of the lower platform.

In another example, the upper cabin may include an upper cabin body seated on the lower platform and a guide groove recessed to an inner side of the upper cabin body. The upper guide groove may be configured such that a portion of the first support is inserted thereinto when being coupled to the mobile object assembly station whereby the first support is guided thereby.

In another example, when it is assumed that a direction in which the station body faces the mobile object when the mobile object proceeds toward the station body to press the upper cabin upwards is a front side, the guide groove may be inclined upwards with respect to the front side.

In another example, when it is assumed that a direction in which the station body faces the mobile object when the mobile object proceeds toward the station body to press the upper cabin upwards is a front side and that an opposite direction thereof is a rear side, the upper cabin may further include a protrusion member protruding from the upper cabin body rearwards. Also, the mobile object assembly station may further include a stopper groove recessed from a front side surface of the station body rearwards, formed at a location corresponding to the protrusion member, configured such that the protrusion member is inserted thereinto, and that restricts upward movement of the protrusion member.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In providing reference numerals to the constituent elements of the drawings, the same elements may have the same reference numerals even if they are displayed on different drawings. Further, in the following description of the present disclosure, a detailed description of known functions and configurations incorporated herein has been omitted when it may make the subject matter of the present disclosure rather unclear. When a component, device, element, or the like of the present disclosure is described as having a purpose or performing an operation, function, or the like, the component, device, or element, should be considered herein as being "configured to" meet that purpose or perform that operation or function.

Mobile Object Assembly Station 100

Figure 1:
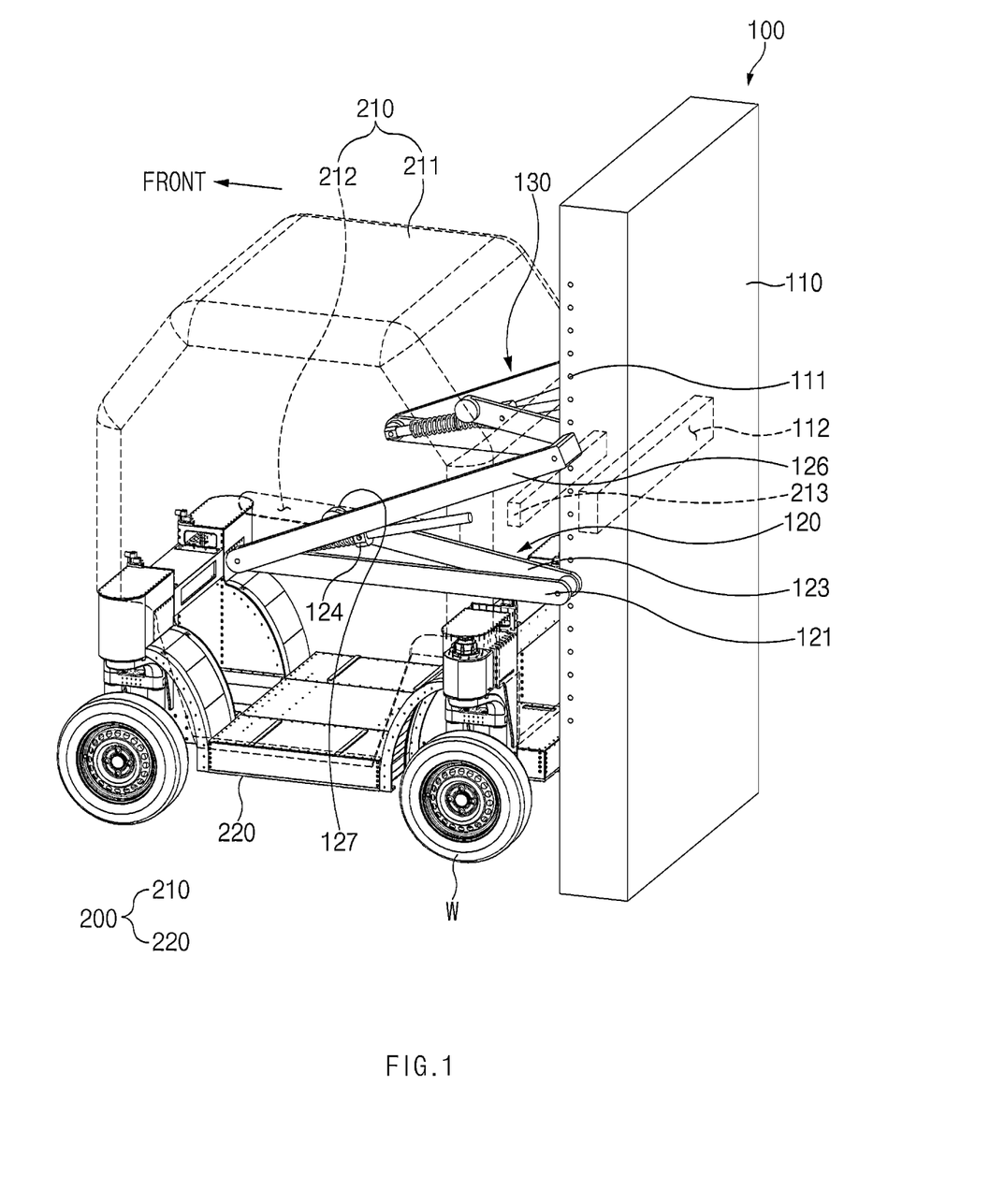
FIG. 1 is a view conceptually illustrating a mobile object assembly station and a mobile object according to an embodiment of the present disclosure.

FIG. 1 is a view conceptually illustrating a mobile object assembly station 100 and a mobile object 200 according to an embodiment of the present disclosure. A mobile object assembly station 100 according to an embodiment of the present disclosure may be a mobile object assembly station for assembling an upper cabin 210 of the mobile object 200 on a lower platform 220. Hereinafter, a basic structure of the mobile object 200 is described for convenience of description. For example, the mobile object 200 may be a vehicle, but the present disclosure is not limited thereto.

Figure 2:
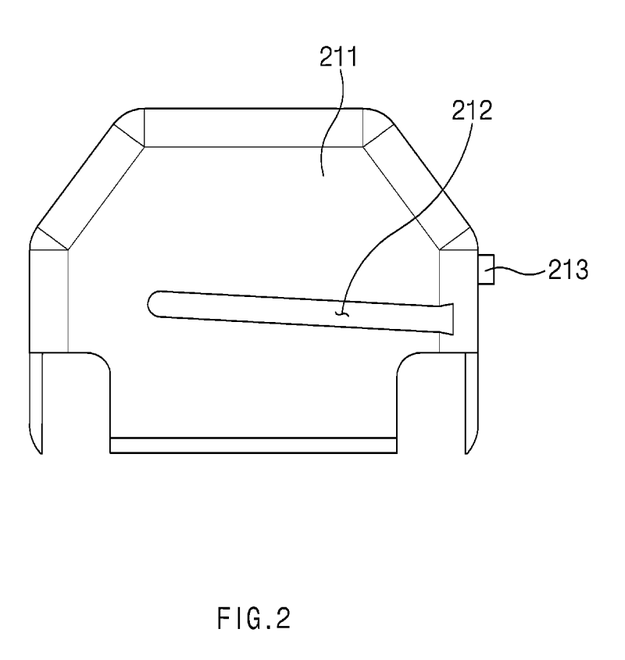
FIG. 2 is a view conceptually illustrating an example of an upper cabin of a mobile object according to an embodiment of the present disclosure.

As illustrated in FIG. 1, the mobile object 200 may include the upper cabin 210 and the lower platform 220. The upper cabin 210 may be variously formed according to a purpose of the mobile object for which it is to be used. FIG. 2 is a view conceptually illustrating an example of the upper cabin 210 of the mobile object according to an embodiment of the present disclosure.

As an example, an upper cabin for a food truck may include a cooling facility. As another example, an upper cabin for physical distribution may include a load box and the like. The lower platform 220 may be configured such that the upper cabin 210 is seated on an upper side thereof and may be coupled to the upper cabin 210 to be separable. The lower platform 220 may include wheels "W" and a suspension. The wheels "W" may be wheels that may be rotated by 360 degrees about an axis that extends in a leftward/rightward (i.e., a horizontal) direction.

The mobile object assembly station 100 according to an embodiment of the present disclosure may be a mobile object assembly station, on which the upper cabin 210 separated from the lower platform 220 may be held.

The mobile object assembly station 100 according to an embodiment of the present disclosure may include a station body 110 and a first support 120. The station body 110 may extend in an upward/downward direction. For example, the station body 110 may be an inner wall provided in a garage, a parking lot, or the like. The first support 120 may be coupled to one side surface (i.e., a first side surface) of the station body 110, and may press one side surface (i.e., a first side surface) of the upper cabin 210 of the mobile object upwards.

Figure 3:
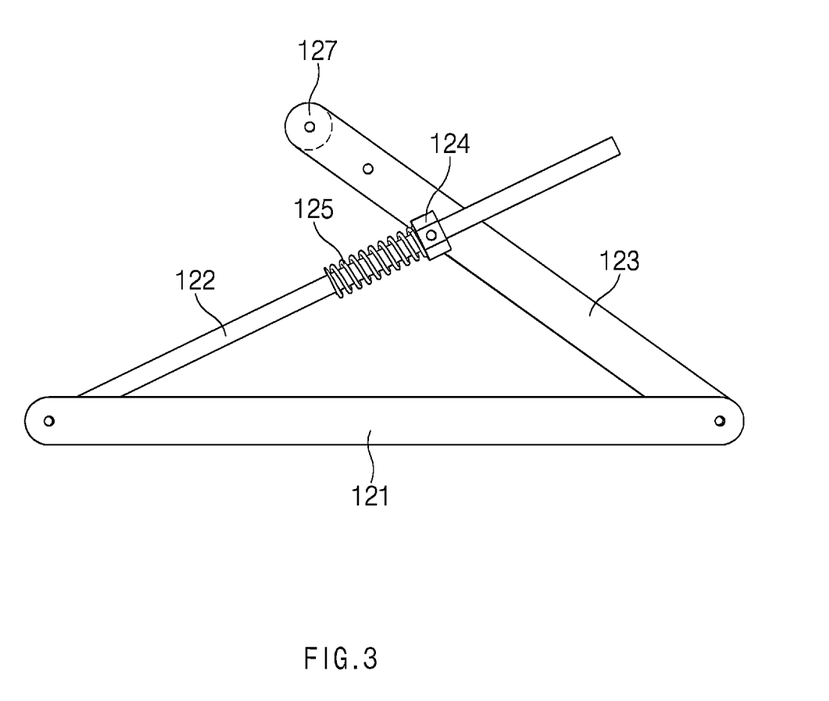
FIG. 3 is a view conceptually illustrating a state in which a fourth link member is omitted from a first support of a mobile object assembly station according to an embodiment of the present disclosure.
Figure 4:
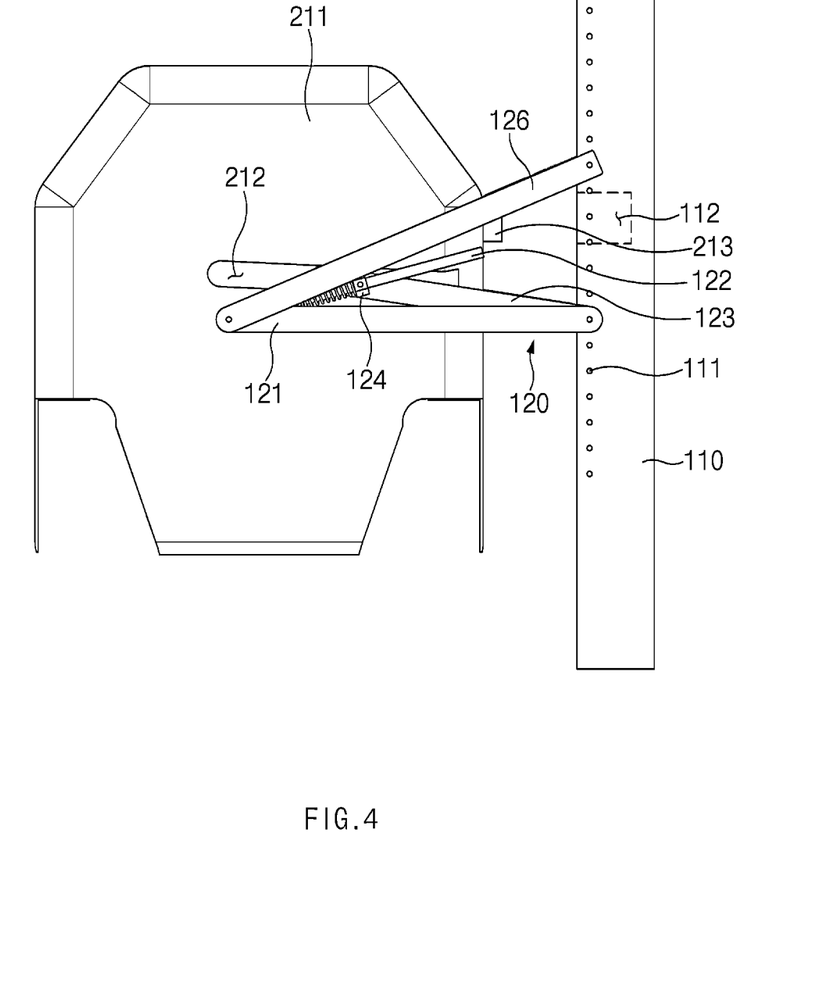
FIG. 4 is a view conceptually illustrating a state in which an upper cabin is coupled to a first support of a mobile object assembly station according to an embodiment of the present disclosure.

Hereinafter, a detailed shape of the first support 120 is described below with reference to FIGS. 1, 3, and 4. FIG. 3 is a view conceptually illustrating a state in which a fourth link member 126 (FIG. 1) is omitted from the first support 120 of the mobile object assembly station 100 according to an embodiment of the present disclosure. FIG. 4 is a view conceptually illustrating a state in which the upper cabin 210 is coupled to the first support 120 of the mobile object assembly station 100 according to an embodiment of the present disclosure.

Meanwhile, in the specification, a direction in which the station body 110 faces the mobile object when the mobile object proceeds toward the station body 110 is defined as a front side, for convenience of description. Then, as illustrated in FIG. 1, the first support 120 may include a first link member 121, a second link member 122, a third link member 123, and a connection member 124. The first link member 121 may extend forwards and one end thereof may be fixed to one side surface of the station body 110.

One end of the second link member 122 may be connected to a front distal end of the first link member 121 to be rotatable.

One end of the third link member 123 may be coupled to one side surface (i.e., a first side surface) of the station body 110 to be rotatable. The third link member 123 may have a shape that crosses the second link member 122. Furthermore, as illustrated in FIG. 1, the third link member 123, as described below, may be a part that is directly connected to the upper cabin 210 of the mobile object 200.

The connection member 124 may connect the second link member 122 and the third link member 123. Furthermore, the connection member 124 may be coupled to one point of the third link member 123 and the second link member 122 may pass therethrough.

The connection member 124 may be disposed on an upper side of the first link member 121. This may mean that the second link member 122 and the third link member 123 are disposed in an area on the upper side of the first link member 121.

The first support 120 may further include the fourth link member 126. The fourth link member 126 may extend forwards. One end of the fourth link member 126 may be fixed to one side surface (i.e., the first side surface) of the station body 110 and may be fixed to an upper side of one end of the first link member 121. An opposite end thereof may be connected to a front distal end of the first link member 121. The fourth link member 126 may prevent the first link member 121 from being deflected due to a load thereof.

Meanwhile, a plurality of holes 111 arranged in an upward/downward (i.e., a vertical) direction may be formed on one side surface (i.e., first side surface) of the station body 110. One end of the first link member 121 may be fixed to any one of the plurality of holes 111 and one end of the fourth link member 126 may be fixed to another one of the plurality of holes 111. Then, the hole to which the one end of the fourth link member 126 is fixed may be located on an upper side of (i.e., above) the hole to which the one end of the first link member 121 is fixed.

Because the station body 110 has the plurality of holes 111, a location of the first support 120 may be conveniently changed. The mobile object assembly station 100 according to an embodiment of the present disclosure may thus be modified and applied when various models of upper cabins 210 are replaced.

The first support 120 may further include an elastic member 125. The elastic member 125 may further include one end fixedly coupled to one point of the second link member 122 and an opposite end that elastically supports the connection member 124.

Because the elastic member 125 elastically supports the connection member 124, a pressure (i.e., a force) that is received by the third link member 123 downwards by the upper cabin 210 of the mobile object 200 is supported by the elastic member 125. Accordingly, a location of the upper cabin 210 of the mobile object 200 may be maintained.

The first support 120 may further include a boss member 127. The boss member 127 may protrude from a front distal end of the third link member 123 inwards in a leftward/rightward direction (i.e., a horizontal direction) and may be inserted into a guide groove 212 formed in the upper cabin 210. When the upper cabin 210 is separated from the lower platform 220, the boss member 127 may support a surface of the upper cabin 210 that defines the guide groove 212 while pressing the surface upwards.

The mobile object assembly station 100 according to an embodiment of the present disclosure may further include a second support 130 (FIG. 1). The second support 130 (FIG. 1) may be coupled to the opposite (i.e., a second) side surface of the station body 110 and may press the opposite (i.e., second) side surface of the upper cabin 210 upwards. The first support 120 and the second support 130 (FIG. 1) may have corresponding shapes. This may mean that the second support 130 (FIG. 1) also may include elements corresponding to the constituent elements of the first support 120.

The mobile object assembly station 100 according to an embodiment of the present disclosure may support the upper cabin 210 more stably through the first supports 120 and the second supports 130 (FIG. 1) that form a pair.

Mobile Object Assembly System

Hereinafter, the mobile object assembly system according to an embodiment of the present disclosure is described based on the description of the above-described mobile object assembly station 100. The mobile object assembly system according to an embodiment of the present disclosure, as illustrated in FIG. 1, may include the mobile object 200 and the mobile object assembly station 100. The above-described contents may be referenced for a detailed description of the mobile object assembly station 100.

The mobile object 200 may include the upper cabin 210 and the lower platform 220. The lower platform 220 may be configured such that the upper cabin 210 is seated on an upper side thereof and may be coupled to the upper cabin 210 to be separable.

Figure 5:
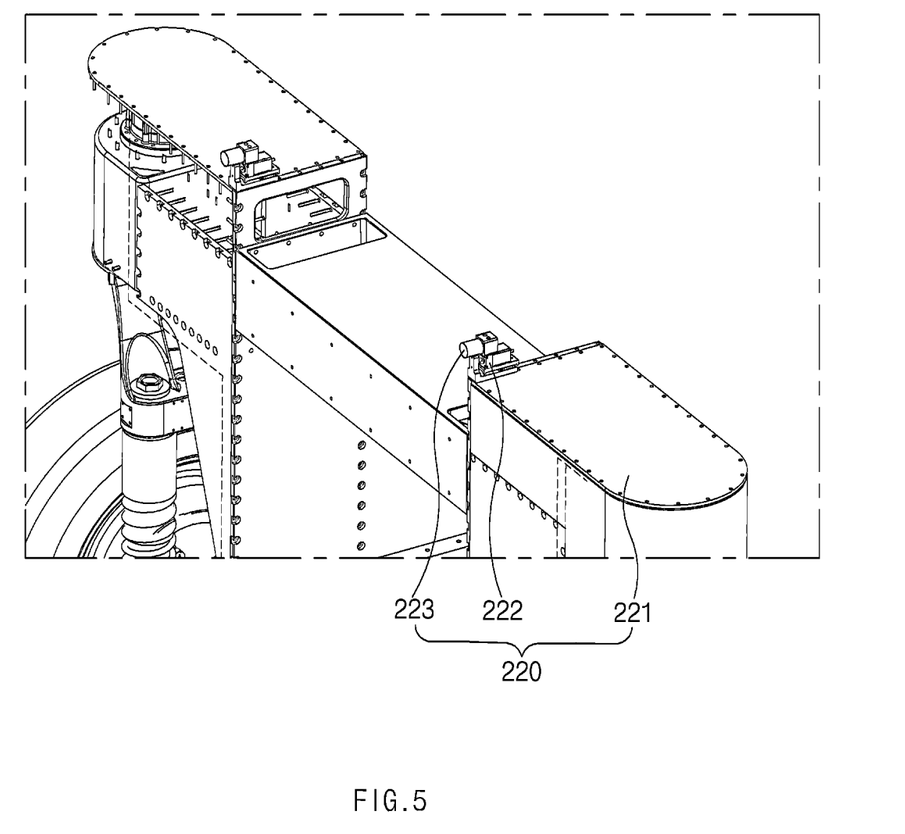
FIG. 5 is an enlarged perspective view of a lower platform of a mobile object according to an embodiment of the present disclosure.

FIG. 5 is an enlarged perspective view of the lower platform 220 of the mobile object according to an embodiment of the present disclosure. As illustrated in FIG. 5, the lower platform 220 may include a body member 221, a coupling member 222, and a sensor member 223 (i.e., a sensor). The body member 221 may be configured such that the upper cabin 210 is seated thereon.

The coupling member 222 may be coupled to the body member 221 and may be configured to protrude in a specific direction and may couple the upper cabin 210 and the lower platform 220 as the coupling member 222 protrudes. In FIG. 1, the specific direction may mean a front side. As an example, the coupling member 222 may be a linear motor and a hole corresponding to a location of the coupling member 222 and may be formed in the upper cabin 210 so that a shaft of the linear motor passes through the hole. However, this is merely an example and various modifications may be made or accommodated.

The sensor member 223 may be coupled to a distal end of the coupling member 222 in a specific direction. The sensor member 223 may be configured to acquire information on a distance between a distal end of the coupling member 222 in the specific direction and the upper cabin 210. The sensor member 223 may deliver the acquired information to a controller. For example, the sensor member 223 may be a camera. However, this is merely an example and various modifications may be made or accommodated.

The controller may determine whether the upper cabin 210 and the lower platform 220 are coupled to each other, based on the information acquired by the sensor member 223. The controller may include a processor and a memory.

The processor may include a microprocessor such as a field programmable gate array (FPGA), an application specific integrated circuit (ASIC), and a central processing unit (CPU). The memory may store control instructions that are basic in generating instructions for determining whether the coupling member 222 is operated by the processor. The memory may be a data storage such as a hard disk drive (HDD), a solid state drive (SSD), a volatile medium, or a nonvolatile medium.

A pair of coupling members 222 and a pair of sensor members 223 may be provided on the left and right sides of the lower platform 220, respectively. Because the pair of coupling members 222 and the pair of sensor members 223 are provided, it is to be determined more accurately whether the upper cabin 210 and the lower platform 220 are properly arranged.

Meanwhile, the upper cabin 210 may include an upper cabin body 211 and a guide groove 212. The upper cabin body 211 may be seated on the lower platform 220. The guide groove 212 may be recessed to an inner side of the upper cabin body 211. Furthermore, the guide groove 212 may be configured such that a portion of the first support 120 is inserted thereinto when being coupled to the mobile object assembly station 100. The first support 120 is thereby guided by the guide groove 212.

The guide groove 212 may be inclined upwards with respect to the front side. Because the guide groove 212 is inclined upwards with respect to the front side, the upper cabin 210 of the mobile object may be raised upwards. A height by which the guide groove 212 extends upward may correspond to a degree of change in a height of the changed suspension because the upper cabin 210 is not located on an upper side of the lower platform 220.

The upper cabin 210 may include a protrusion member 213. The protrusion member 213 may protrude from the upper cabin body 211 to the rear side that is an opposite direction to the front side.

The mobile object assembly station 100 (FIG. 1) may include a stopper groove 112 (FIG. 1). The stopper groove 112 (FIG. 1) may be recessed rearward from a front side surface of the station body 110 and may be formed at a location corresponding to the protrusion member 213. The stopper groove 112 (FIG. 1) may be configured such that the protrusion 213 is inserted thereinto and may restrict upward movement of the protrusion member 213.

Operational Process of Mobile Object Assembly System

FIGS. 6-9 are views illustrating an operation of a mobile object assembly system according to an embodiment of the present disclosure. Hereinafter, referring to FIGS. 6-9, a process is described of separating the lower platform 220 and the upper cabin 210 in an operational process of the mobile object assembly system of the present disclosure.

Figure 6:
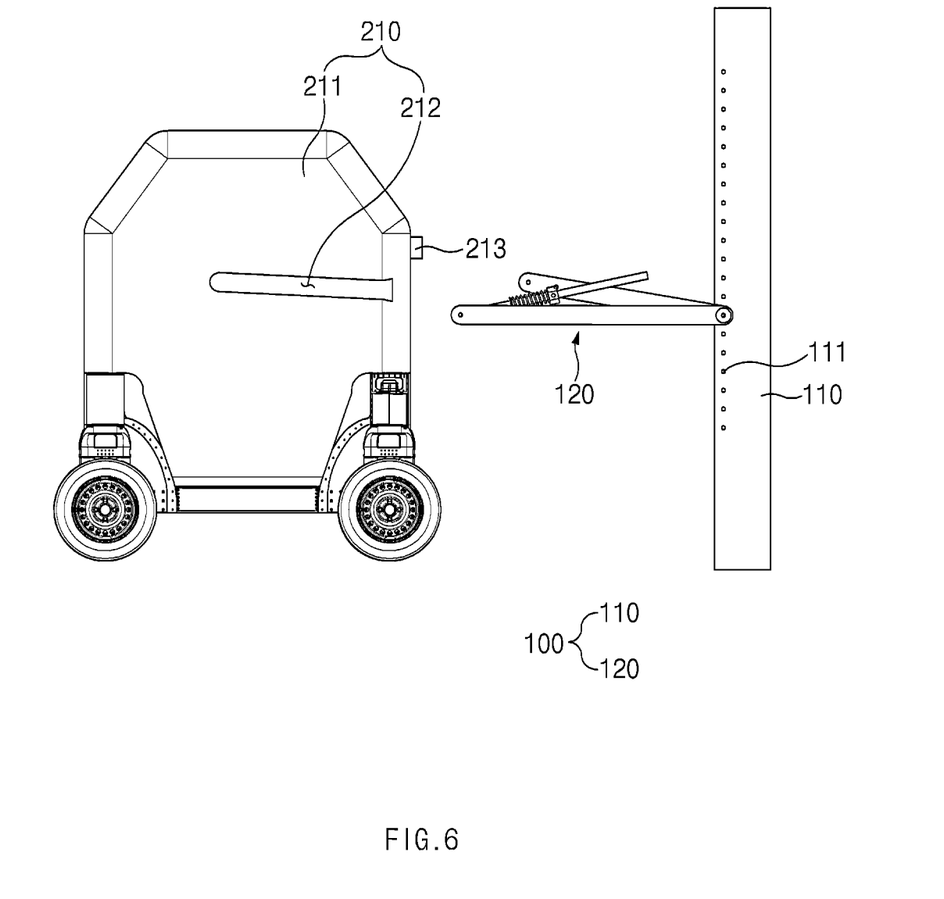
FIGS. 6-9 are views illustrating an operation of a mobile object assembly system according to an embodiment of the present disclosure.

First, as illustrated in FIG. 6, the mobile object 200 is disposed on a front side of the mobile object assembly station 100.

Figure 7:
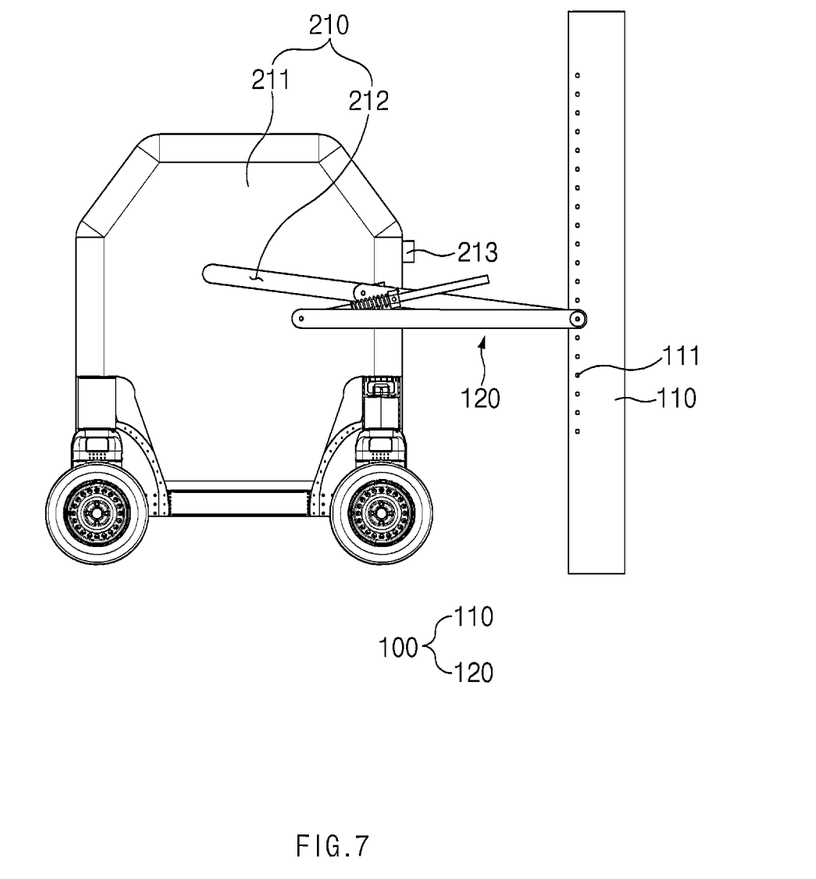

Second, as illustrated in FIG. 7, the mobile object 200 is moved toward the mobile object assembly station 100. In this process, the first support 120 and the second support 130 (FIG. 1) are inserted into the guide groove 212.

Figure 8:
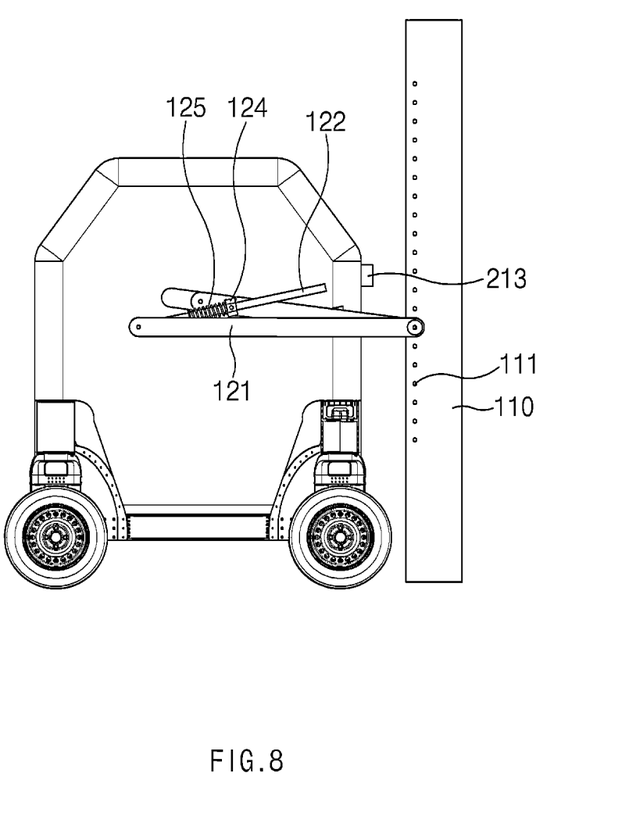

Third, as illustrated in FIG. 8, the mobile object 200 is continuously moved toward the mobile object assembly station 100. In this process, due to the shape of the guide groove 212, the upper cabin 210 of the mobile object is partially moved upwards.

Fourth, the upper cabin 210 is separated from the lower platform 220 by operating the coupling member 222.

Figure 9:
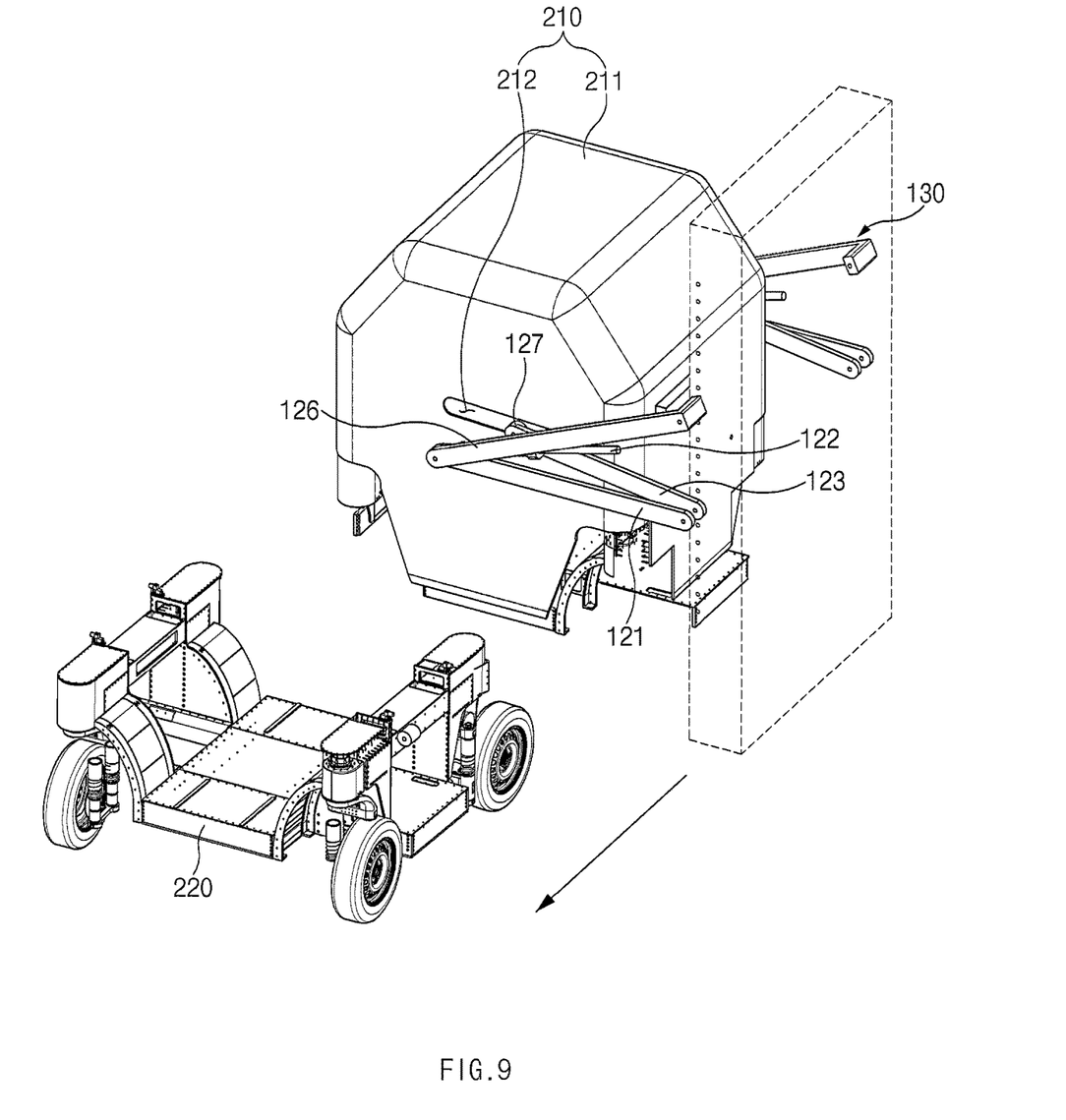

Finally, as illustrated in FIG. 9, the wheels "W" of the lower platform 220 are rotated such that the lower platform 220 is moved in another direction, such as away from the mobile object assembly station. Thereafter, when the upper cabin 210 is assembled (i.e., placed) on another lower platform 220, the lower platform 220 is located on a lower side of the upper cabin 210 and the coupling member 222 is operated.

According to the present disclosure, through the link structure and the spring coupled to the link structure, the upper cabin may be raised upward without using a separate power device, whereby the upper cabin may be easily replaced.

The above description is a simple exemplification of the technical spirit of the present disclosure. The embodiments of the present disclosure may be variously modified by those having ordinary skill in the art to which the present disclosure pertains without departing from the essential features of the inventive concept. Accordingly, the embodiments disclosed in the present disclosure are not provided to limit the technical spirit of the present disclosure but are provided to describe the inventive concept of the present disclosure. The scope of the technical spirit of the present disclosure is not limited by the embodiments. Accordingly, the technical scope of the present disclosure should be construed by the attached claims. The technical spirit within the equivalent scope of the attached claims falls within the scope of the present disclosure.

What is claimed is:

1. A mobile object assembly station comprising:
   a station body extending in an upward/downward direction; and
   a first support coupled to a first side surface of the station body and configured to press a first side surface of an upper cabin of a mobile object upwards,
   wherein based on a direction in which the station body faces the mobile object being a front side when the mobile object proceeds toward the station body, the first support includes:
   a first link member extending forward from the station body, the first link member fixed to the first side surface of the station body;
   a second link member, one end of which is connected to a front distal end of the first link member to be rotatable;
   a third link member, one end of which is coupled to the first side surface of the station body to be rotatable;
   a connection member connecting the second link member and the third link member, the connection member coupled to one point of the third link member to be rotatable, the second link member passing through the connection member;
   a fourth link member extending forward from the station body, one end of the fourth link member being fixed to one side surface of the station body, the one end of the fourth link member being fixed to the station body above one end of the first link member fixed to the first side surface of the station body, an opposite end of the fourth link member being connected to a front distal end of the first link member,
   wherein a plurality of holes arranged in a vertical direction are formed on the one side surface of the station body wherein the one end of the first link member is fixed to any one of the plurality of holes, and wherein the one end of the fourth link member is fixed to another one of the plurality of holes.

2. The mobile object assembly station of claim 1, wherein the first support further includes:

an elastic member, one end of which is fixedly coupled to one point of the second link member, and an opposite end of which elastically supports the connection member.

3. The mobile object assembly station of claim 1, wherein the connection member is disposed on an upper side of the first link member.

4. The mobile object assembly station of claim 1, wherein the first support further includes:

a boss member protruding from a front distal end of the third link member inwards in a leftward/rightward direction and inserted into a guide groove formed in the upper cabin.

5. The mobile object assembly station of claim 1, further comprising:

a second support coupled to an opposite side surface of the station body, and configured to press an opposite side surface of the upper cabin upwards, wherein the first support and the second support have corresponding shapes.

6. A system comprising:

a mobile object including an upper cabin and a lower platform configured such that the upper cabin is seated on an upper side of the lower platform, wherein the lower platform is coupled to the upper cabin to be separable; and a mobile object assembly station including a station body extending in a upward/downward direction and including a first support coupled to a first side surface of the station body and configured to press a first side surface of the upper cabin separated from the lower platform upwards, wherein the upper cabin includes:

an upper cabin body seated on the lower platform; and a guide groove recessed to an inner side of the upper cabin body and configured such that a portion of the first support is inserted thereinto when being coupled to the mobile object assembly station whereby the first support is guided thereby, wherein based on a direction in which the station body faces the mobile object being a front side when the mobile object proceeds toward the station body to press the upper cabin upwards and an opposite side being a rear side, the upper cabin further comprises:

a protrusion member protruding from the upper cabin body rearwards, wherein the mobile object assembly station further includes a stopper groove recessed from a front side surface of the station body rearwards, the stopper groove formed at a location corresponding to the protrusion member, the stopper groove configured such that the protrusion member is inserted into the stopper groove and further configured to restrict upward movement of the protrusion member.

7. The mobile object assembly system of claim 6, wherein the lower platform includes:

a body member configured such that the upper cabin is seated thereon;

a coupling member coupled to the body member, configured to protrude in a specific direction, and configured to couple the upper cabin and the lower platform while protruding; and a sensor member coupled to a distal end of the coupling member in the specific direction and configured to acquire information on a distance between the distal end of the coupling member in the specific direction and the upper cabin.

8. The mobile object assembly system of claim 7, wherein a pair of coupling members and a pair of sensor members are provided on left and right sides of the lower platform.

9. The mobile object assembly system of claim 6, wherein based on a direction in which the station body faces the mobile object being a front side when the mobile object proceeds toward the station body to press the upper cabin upwards, the guide groove is inclined upwards with respect to the front side.

* * * * *